United States Patent [19]

Yamasaki

[11] Patent Number: 5,083,258
[45] Date of Patent: Jan. 21, 1992

[54] PRIORITY CONTROL SYSTEM
[75] Inventor: Takashi Yamasaki, Itami, Japan
[73] Assignee: Mitsubishi Denki Kabushiki Kaisha, Tokyo, Japan
[21] Appl. No.: 593,708
[22] Filed: Oct. 5, 1990
[30] Foreign Application Priority Data
 Oct. 24, 1989 [JP] Japan .................. 1-277529
[51] Int. Cl.⁵ .................... G06F 13/18; G06F 13/32
[52] U.S. Cl. .................... 395/725; 364/241.2; 364/241.4; 364/241.5; 364/242.8; 364/242.9; 364/DIG. 1
[58] Field of Search .................... 364/200, 900
[56] References Cited
 U.S. PATENT DOCUMENTS
 4,034,349 7/1977 Monaco et al. .................... 364/200
 4,648,029 3/1987 Cooper et al. .................... 364/200
 4,716,523 12/1987 Bunnus, Jr. et al. .................... 364/200
 4,777,591 10/1988 Cnang et al. .................... 364/200
 4,837,677 6/1989 Burrus, Jr. et al. .................... 364/200
 4,937,734 6/1990 Bechtolsheim .................... 364/200

Primary Examiner—Michael R. Fleming
Assistant Examiner—Robert S. Hauser
Attorney, Agent, or Firm—Townsend and Townsend

[57] ABSTRACT

A priority control system for determining a priority order of bus requests in an information processor includes a main group of first bus request sources; an auxiliary group of second bus request sources provided in one of the first bus request sources; and a sampling unit responsive to the bus use conditions to effect sampling to check if there is a bus request for either said main or said auxiliary group.

2 Claims, 4 Drawing Figures

PRIORITY CONTROL SYSTEM

BACKGROUND OF THE INVENTION

1. Field of the Invention

The present invention relates to priority control systems for determining rights to bus use for performing direct data transfer between the random access memory (RAM) of an information processor and periphery equipment without using the central processing unit (CPU).

2. Description of the Prior Art

For DMA transfer bus interrupts, there are two cases; one in which rights to bus use by the CPU are prioritized in a main group and the other in which a priority order is determined for a subgroup of a requesting source in the main group.

A conventional priority control system is shown in FIG. 3. The priority control system includes a CPU 1; a dynamic memory or RAM 2; four input/output (I/O) devices 3; a data bus 4; an address bus 5; and a direct memory access (DMA) controller 7.

The DMA controller 7 includes a sampling signal generator 6; a priority circuit 8; a priority encoder 9; an access controller 10; and a DRAM controller 11. The RAM requires periodic refreshing. The priority circuit 8 determines a priority order among bus requests. The priority circuit 8 for performing main sampling is composed of a circuit in which an interrupt priority order is determined by hardware. The priority encoder 9 for determining a priority order among channels of the I/O devices 3 is composed of a circuit for performing auxiliary sampling. For example, the priority encoder 9 has four channel input ports, of which one channel is given priority and outputted as a bus request to a predetermined channel of the priority circuit 8. The I/O devices 3 consist of four circuit periphery devices, for example, which are connected to respective channel input ports of the priority encoder 9. The priority order from top to bottom in the priority circuit 8 is as follows: (1) RAM refreshing request by the DRAM controller 11; (2) HOLD external interrupt request; (3) DRQ bus request by the I/O devices 3; and (4) bus requests by the CPU 1. Consequently, there are a main priority group connected to the priority circuit 8 and a auxiliary priority group within the I/O devices 3 which is one of the inputs to the priority circuit 8. The sampling signal generator 6 outputs a machine cycle basic clock to the priority circuit 8 and a sampling signal 2 having a frequency of a half of the machine cycle to the priority encoder 9. Gates 1-1, 1-2, 10-1, 10-2, 11-1, and 11-2 interconnect the buses 4 and 5 to the respective controllers. DMACK is a response signal to the I/O chip of a bus requesting source, etc. to which priority is given.

The operation will be described with reference to FIG. 4. The basic clock $\phi$ synchronized with the machine cycle, for example, and the half clock $2\phi$ made by dividing the basic clock by 2 are inputted to the sampling signal generator 6. Consequently, DRQL and DRQH are outputted in synchronism with "H" of $\phi$ in the periods "H" and "L" of $2\phi$, respectively. The DRQL and DRQH are inputted to the priority encoder 9 and the priority circuit 8, respectively. The priority encoder 9 samples DMA requests DRQs from the respective I/O devices in synchronism with the rising edge of DRQL to select a request of the highest priority and outputs it as a bus request BRQ to the priority circuit 8. The priority circuit 8 samples the bus request BRQ, etc. in synchronism with the rising edge of DRQH, accepts the BRQ if there is neither DRAM refreshing request a nor HOLD request b which are given higher priorities than the BRQ, and outputs a BAK signal, turning off the gates 1-1 and 1-2 which have connected the buses 4 and 5 to the CPU 1 and on the gates 10-1 and 10-2 connected to the access controller (DMAC) 10 to start bus control by the DMAC 10. When the DMAC 10 connects the I/O devices 3 and the RAM 2 by bus control, a signal DMACK for selecting a chip to which the highest priority is given by the priority encoder 9 is outputted to a predetermined I/O device 3 for effecting a DMA transfer.

However, when the BUSY signal is "H" at the main sampling time DRQH, the DMAC 10 is unable to receive the bus use right so that it must wait until the BUSY signal becomes "L". Consequently, the period between the first sampling at the auxiliary sampling signal DRQL and the time when the DMAC 10 resumes the bus use can be so long as shown by A in FIG. 4 that the information becomes too old; that is, it is not the latest DMA request from another I/O device 3.

SUMMARY OF THE INVENTION

Accordingly, it is an object of the invention to provide a priority control system capable of monitoring the bus use conditions to use either the main or the auxiliary sampling, thereby not only making constant the period between the auxiliary sample and the start of bus use but also providing a response in the shortest time.

According to the invention there is provided a priority control system having a bus, which includes a main group of first bus request sources; an auxiliary group of second bus request sources provided in one of the first bus request sources; a unit for alternating main and auxiliary sampling for checking if there is a bus request for the main or auxiliary group; and a bus use condition detector for detecting use conditions of the bus to select either the main or said auxiliary sampling.

When the bus condition detector finds that the bus is not used, only the main sampling is taken of the bus request sources of the main group. By making constant the period between the auxiliary sampling of the auxiliary group and the start of bus use and enabling the DMA controller to immediately accept the bus request which is made by a bus request source in the main group upon completion of the bus use by the auxiliary group, it is possible to transfer the right to bus use to the main group of the higher priority without a waste of time.

DESCRIPTION OF THE PREFERRED EMBODIMENT

Figure 1:
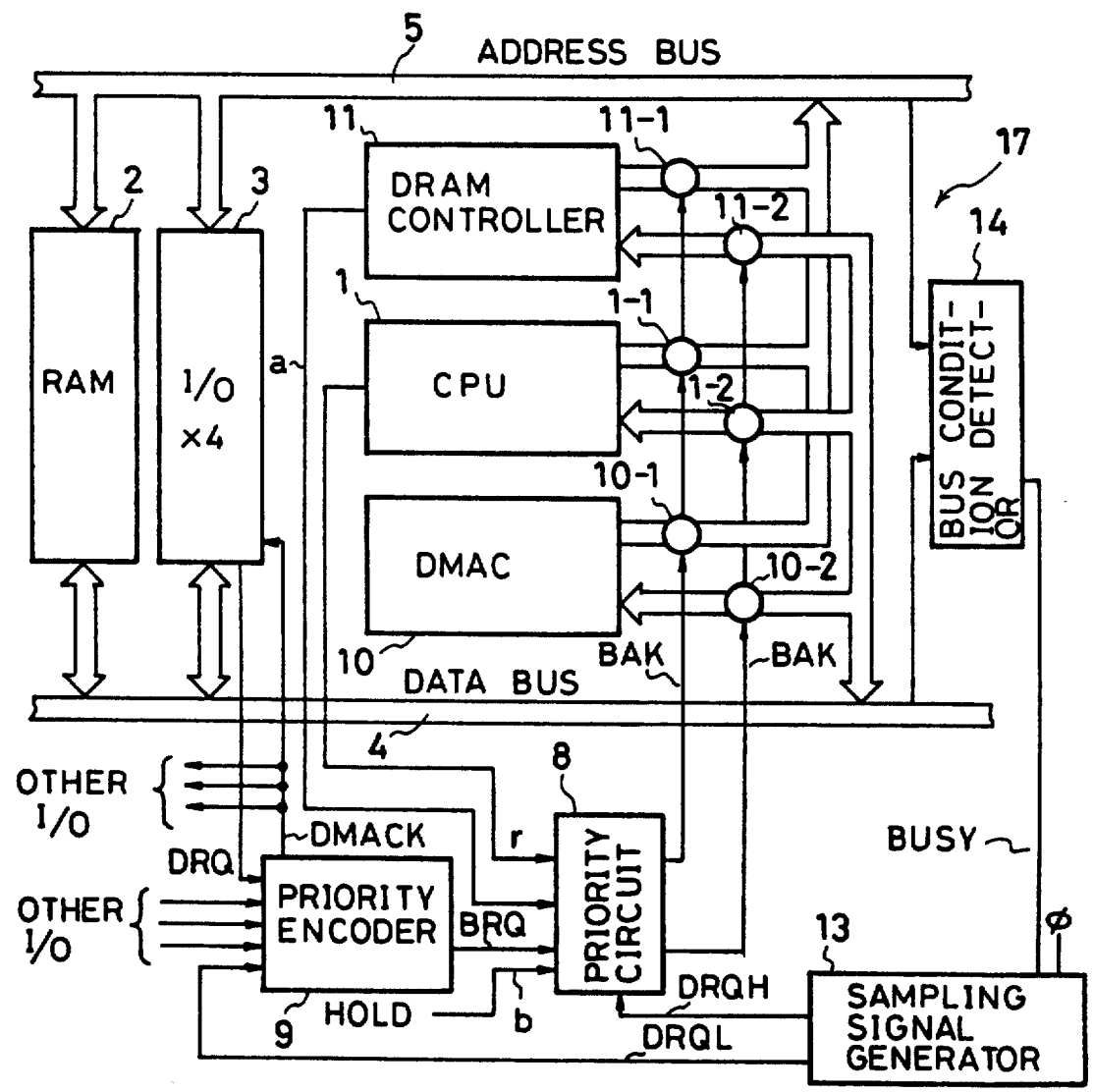
FIG. 1 is a block diagram of a priority control system according to an embodiment of the invention.

In FIG. 1, the priority control system according to an embodiment of the invention includes a CPU 1; a dynamic memory or RAM 2; four I/O devices 3; a data bus 4; an address bus 5; and a DMA controller 17.

The DMA controller 17 includes a priority circuit 8; a priority encoder 9; an access controller 10; a DRAM controller 11; a bus use detector 14; and a sampling signal generator 13. The RAM 2 requires periodic refreshing. The priority circuit 8 determines a priority order among bus requests. The priority circuit 8 for performing main sampling is composed of a circuit in which the interrupt priority order is determined by hardware. The priority encoder 9 determines a priority order among the channels and performs auxiliary sampling. For example, it has 4 channel input ports, of which one channel is given priority and outputted to a predetermined input port of the priority circuit 8 as a bus request by the I/O devices 3. The I/O devices 3 have four periphery devices, for example, which are connected to respective channels of the priority encoder 9. The priority order from top to bottom in the priority circuit 8 is as follows: (1) DRAM refresh request for the RAM; (2) HOLD external interrupt request; (3) BRQ bus request by the I/O devices 3; and (4) bus requests by the CPU 1. Consequently, there is a main priority group connected to the priority circuit 8 and an auxiliary priority group within the I/O devices 3 which is one of the inputs to the priority circuit 8. The bus condition detector 14 detects the use conditions of the buses 4 and 5 based on a bus acknowledge BAK which is outputted to the CPU 1 from the priority circuit 8.

Figure 2:
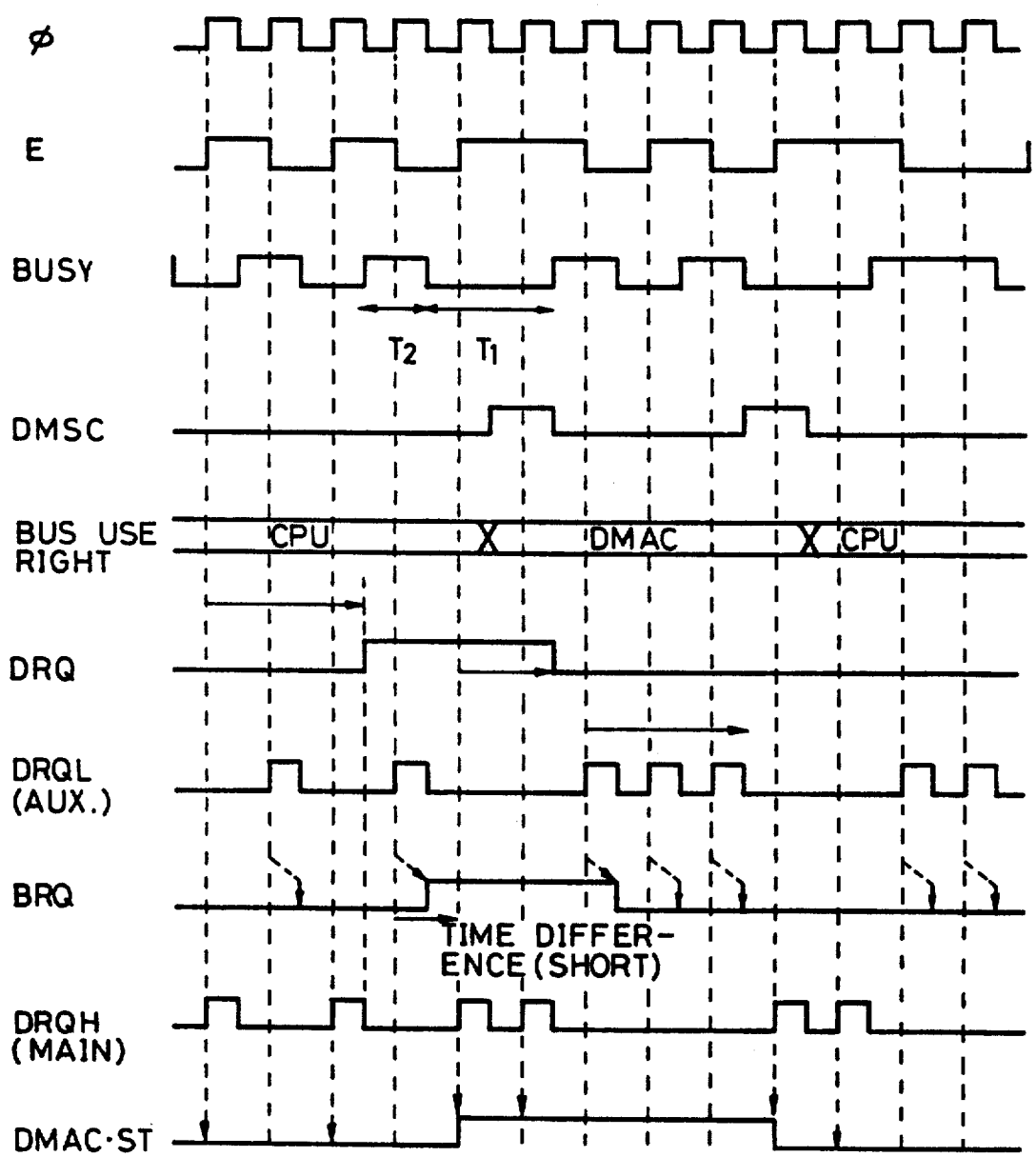
FIG. 2 a timing chart useful for explaining the operation of the priority control system of FIG. 1.
Figure 3:
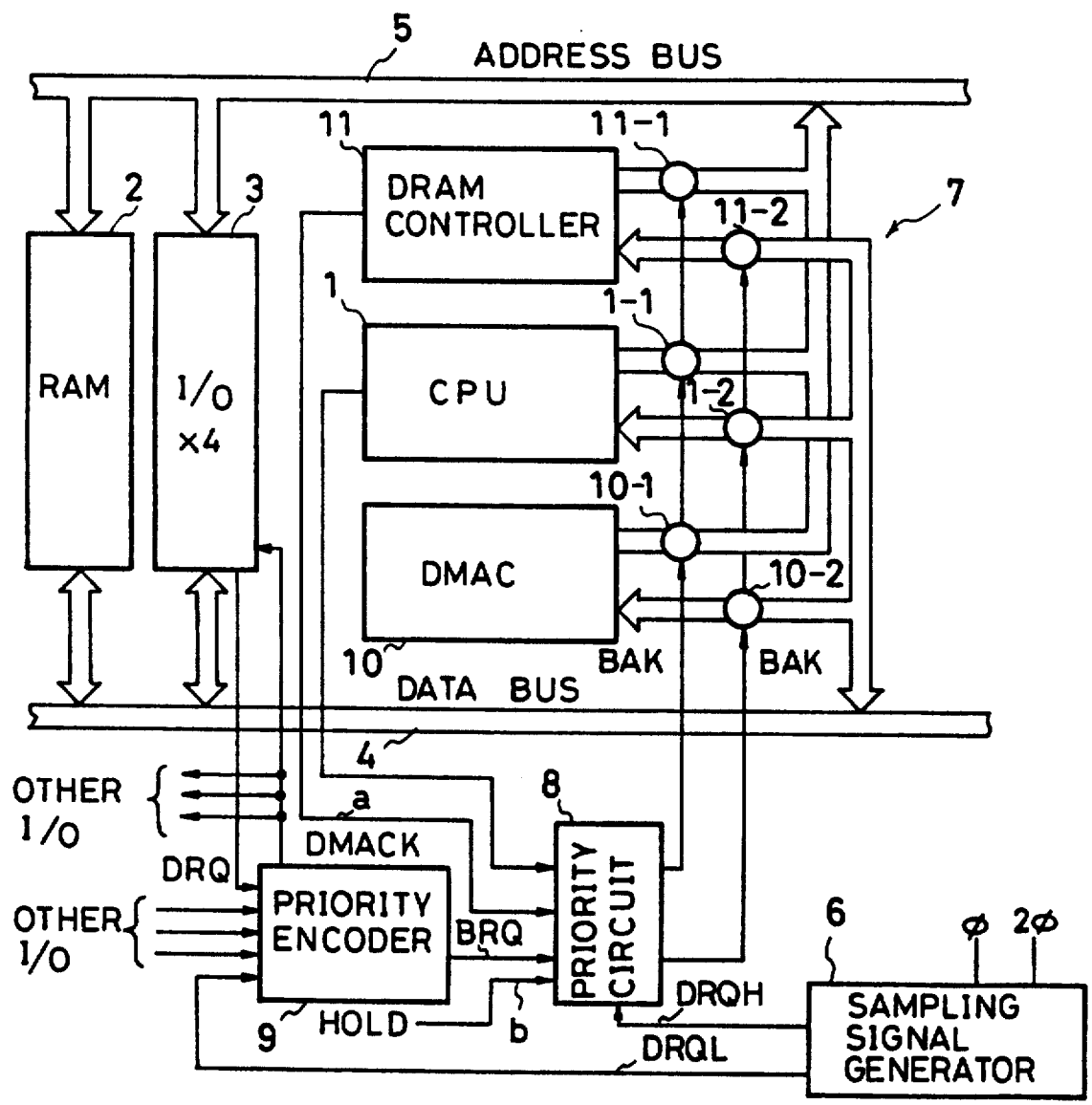
FIG. 3 is a block diagram of a conventional priority control system.
Figure 4:
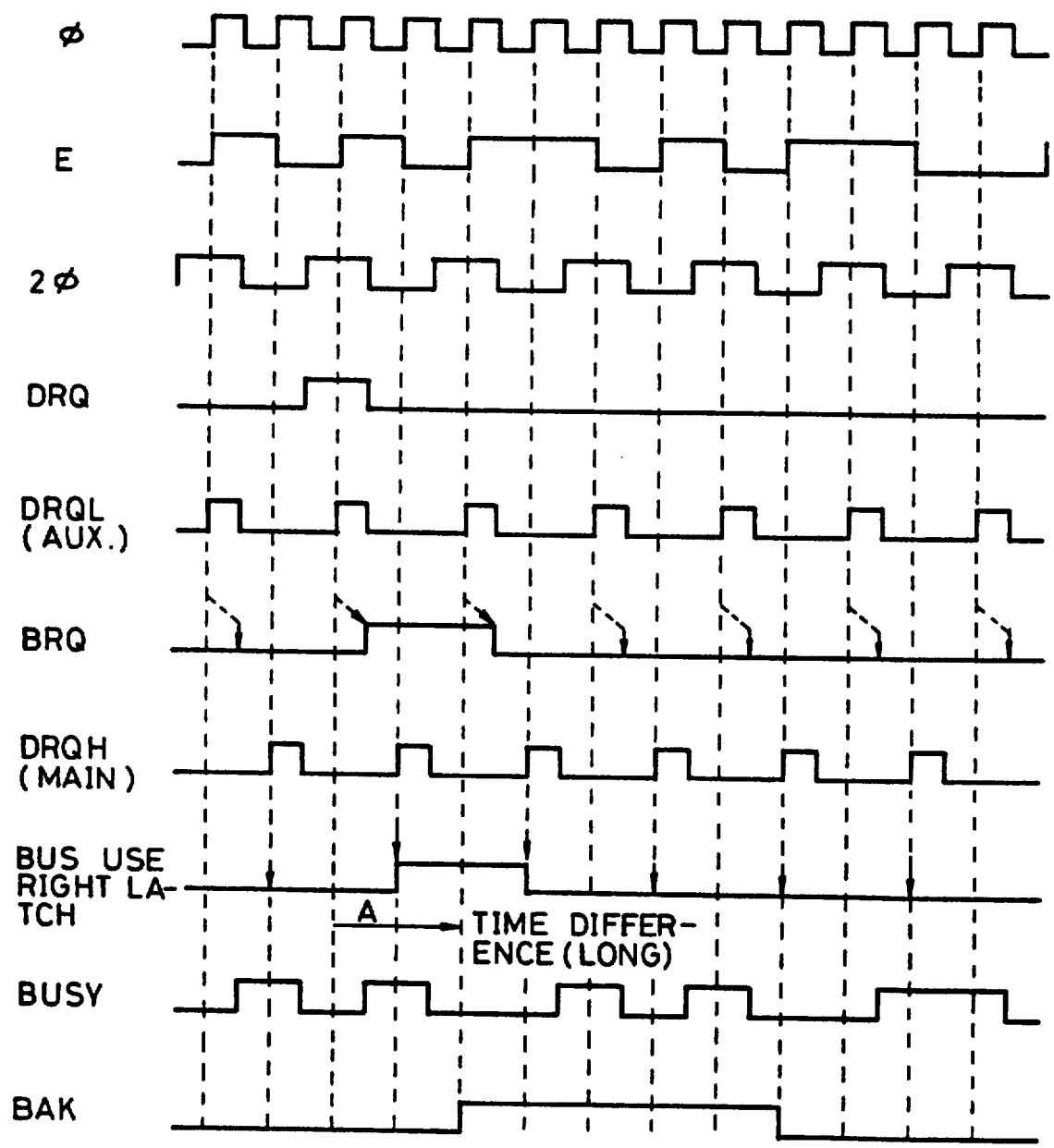
FIG. 4 is a timing chart useful explaining the operation of the priority control system of FIG. 3.

The operation will be described with reference to FIG. 2. The bus condition detector 14 monitors the use conditions of the buses 4 and 5 to generate a BUSY signal. In response to the BUSY and the internal clock $\phi$, the sampling signal generator 13 generates DRQL and DRQH. That is, DRQL and DRQH are generated in synchronism with "H" of $\phi$ during "H" and "L" of the BUSY, respectively. Since the bus is used during the period $T_2$ in which the BUSY is "H", the auxiliary group is sampled. The priority encoder 9 samples DMA requests DRQs from the respective I/O devices in synchronism with the rising edge of DRQL to select a request of the highest priority and outputs a bus request BRQ to the priority circuit 8. If the BUSY stays "H" or the bus is continuously in use, the above auxiliary sampling and the prioritizing of the auxiliary group are repeated to update the information.

The priority circuit 8 samples the bus request BRQ, etc. in synchronism with the rising edge of DRQH to generate a BAK signal if there is neither DRAM refresh request a nor HOLD request b which have higher priorities than the BRQ, turning off the gate 1-1 and 1-2 which have connected the buses 4 and 5 to the CPU 1 and on the gates 10-1 and 10-2 connected to the DMAC 10 to start bus control by the DMAC 10. Simultaneously, a signal DMACK for selecting a chip to which the highest priority is given by the priority encoder 9 is outputted to the requesting I/O device to effect a DMA transfer.

When the BUSY becomes "L" or the bus is not used, the bus request BRQ, etc. are sampled in synchronism with the rising edge of DRQH. Since the sampling timing is synchronized with "L" of the BUSY so that the bus is not used, it is unnecessary for the main sampling to wait until the completion of bus use. In addition, the auxiliary sampling is always taken to update the information during the bus use or when the BUSY is "H" so that the main sampling is taken with the latest information (the prioritizing result of the auxiliary group).

It is noted that the invention is applicable to general bus requests as well as the DMA control.

As has been described above, the priority control system according to the invention includes a main group of bus request sources, one of which includes an auxiliary group of bus request sources and a bus use condition detector for detecting the bus use conditions to effect either the main or the auxiliary sampling and generating a sampling signal in synchronism with the result so that it is possible to effect the main sampling immediately after the latest auxiliary sampling. In addition, it is possible to respond with the minimum time to the bus request of a bus request source in the main group of the highest priority for the bus use right, thereby enhancing the DMA transfer capability.

I claim:

1. A priority control system for controlling access to a bus by a plurality of signal sources, each one of said signal sources generating a respective bus request signal to indicate that access to the bus is requested, said plurality of signal sources comprising a main group of signal sources and an auxiliary group of signal sources, the control system comprising:

first encoding means receiving the respective bus request signals of said main group and a selected auxiliary group bus request signal, said received bus request signals being prioritized, said first encoding means selecting the received bus request signal having the highest priority;

second encoding means receiving the respective bus request signals of said auxiliary group, said received auxiliary group bus request signals being prioritized, said second encoding means selecting the received auxiliary group bus request signal having the highest priority, the selected auxiliary group bus request signal coupled to said first encoding means;

means coupled to said first and second encoding means for selecting sampling of either one of said first or second encoding means to determine whether a bus request signal is received at the sampled encoding means; and means coupled to the sampling means for controlling the sampling means to select sampling of said first encoding means while said bus is not busy and to select sampling of said second encoding means while said bus is busy.

2. A priority control system for a computer system having a main group of signal sources and an auxiliary group of signal sources access a bus on a time-division basis, each one signal source of said main group and said auxiliary group generating a bus request signal to request access to the bus, comprising:

second encoding means receiving a first sampling signal and the auxiliary group bus request signals, each received auxiliary group bus request signal having a priority level, the second encoding means in response to the first sampling signal selecting an auxiliary group bus request signal having a highest priority level to generate a first select bus request signal, the second encoding means outputting said first select bus request signal;

first encoding means receiving a second sampling signal, said first select bus request signal and the main group bus request signals, each of the received first select bus request signal and main group bus request signals having a priority level, the first encoding means in response to the second sampling signal selecting the bus request signal of the first select bus request signal and the main group bus request signals having a highest priority level to generate a second select bus request signal, the second select bus request signal at a time when the bus is available determining the one signal source of the main group and auxiliary group to access the bus;

a sampling signal generator receiving a logic signal having a first logic level or a second logic level and generating in response to said logic signal at the first logic level said first sampling signal and generating in response to said logic signal at the second logic level said second sampling signal; and a bus use condition detector coupled to the sampling signal generator and the bus for detecting whether said bus is being used by one signal source of said main group and which outputs to said sampling signal generator said logic signal at the first logic level when said bus is used by a said one signal source of said main group and at the second logic level when said bus is not used by a said one signal source of said main group.

* * * * *